United States Patent
Swamy (10) Patent No.: US 10,769,042 B2
(45) Date of Patent: Sep. 8, 2020

(54) SINGLE PORT DATA STORAGE DEVICE WITH MULTI-PORT VIRTUALIZATION

(71) Applicant: Seagate Technology LLC, Cupertino, CA (US)

(72) Inventor: Vijay Nanjunda Swamy, Bangalore (IN)

(73) Assignee: Seagate Technology LLC, Fremont, CA (US)

( * ) Notice: Subject to any disclaimer, the term of this patent is extended or adjusted under 35 U.S.C. 154(b) by 109 days.

(21) Appl. No.: 16/017,091

(22) Filed: Jun. 25, 2018

(65) Prior Publication Data

US 2019/0391890 A1    Dec. 26, 2019

(51) Int. Cl.
  *G06F 11/20* (2006.01)
  *G06F 11/07* (2006.01)
  *G06F 3/06* (2006.01)
  *G06F 15/173* (2006.01)
  *G06F 11/00* (2006.01)

(52) U.S. Cl.
  CPC .......... *G06F 11/2094* (2013.01); *G06F 3/065* (2013.01); *G06F 3/067* (2013.01); *G06F 3/0619* (2013.01); *G06F 3/0665* (2013.01); *G06F 3/0688* (2013.01); *G06F 11/008* (2013.01); *G06F 11/079* (2013.01); *G06F 11/2092* (2013.01); *G06F 15/17331* (2013.01); *G06F 2201/815* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,889,993 A * | 3/1999 | Kroeger | .............. | G06F 12/0862 717/128 |
| 7,861,107 B1 * | 12/2010 | Coatney | ................ | G06F 11/201 714/3 |
| 7,992,038 B1 * | 8/2011 | Glade | ................. | G06F 11/0712 714/11 |
| 8,560,284 B2 * | 10/2013 | Park | ....................... | G06Q 10/08 703/6 |
| 8,677,023 B2 * | 3/2014 | Venkataraghavan | ........ | H04L 67/1097 709/200 |
| 8,707,085 B2 * | 4/2014 | Bodke | ................. | G06F 11/1423 714/4.11 |
| 9,164,702 B1 * | 10/2015 | Nesbit | ................. | G06F 12/0866 |
| 9,367,398 B1 * | 6/2016 | Ben-Moshe | ............ | G06F 11/14 |
| 9,483,431 B2 | 11/2016 | Bergsten et al. | | |

(Continued)

*Primary Examiner* — Amine Riad
(74) *Attorney, Agent, or Firm* — Hall Estill Attorneys at Law; Tyler J. Mantooth (57) ABSTRACT

Multi-port data storage device capabilities can be provided by a remote host connected to a diskgroup that has a first single port data storage device and a second single port data storage device. Initialization of a first logical volume and a second logical volume in each single port data storage device allows a data access request to be serviced from the remote host with the first logical volume of the first single port data storage device. Data virtualized from the first logical volume of the first single port data storage device to the second volume of the second single port data storage device allows accessing the second volume of the second single port data storage device in response to a request to a data request to the first volume of the first single port data storage device.

20 Claims, 4 Drawing Sheets

(56) References Cited

U.S. PATENT DOCUMENTS

| | | | |
|---|---|---|---|
| 9,612,914 B1* | 4/2017 | Sridharan | G06F 3/065 |
| 9,747,039 B1 | 8/2017 | Coleman et al. | |
| 9,934,173 B1 | 4/2018 | Sakalley et al. | |
| 10,235,064 B1* | 3/2019 | Natanzon | G06F 3/0619 |
| 10,459,664 B1* | 10/2019 | Dreier | G06F 16/128 |
| 2012/0017061 A1* | 1/2012 | Kawaguchi | G06F 3/0607 |
| | | | 711/165 |
| 2014/0068210 A1* | 3/2014 | Deguchi | G06F 9/5027 |
| | | | 711/162 |
| 2015/0012607 A1* | 1/2015 | Cayton | G06F 3/067 |
| | | | 709/212 |
| 2015/0254003 A1 | 9/2015 | Lee et al. | |
| 2016/0085718 A1 | 3/2016 | Huang | |
| 2017/0177216 A1 | 6/2017 | Freyensee et al. | |
| 2017/0206104 A1 | 6/2017 | Sliwa et al. | |
| 2019/0310925 A1* | 10/2019 | Yoshida | G06F 11/2094 |
| 2019/0356609 A1* | 11/2019 | Grunwald | G06F 3/0614 |
| 2019/0356736 A1* | 11/2019 | Narayanaswamy | G06F 3/06 |

* cited by examiner

SINGLE PORT DATA STORAGE DEVICE WITH MULTI-PORT VIRTUALIZATION

SUMMARY OF THE INVENTION

A data storage system, in accordance with some embodiments, has a remote host connected to a diskgroup that has a first single port data storage device and a second single port data storage device. Initialization of a first logical volume and a second logical volume in each single port data storage device allows a data access request to be serviced from the remote host with the first logical volume of the first single port data storage device. Data virtualized from the first logical volume of the first single port data storage device to the second volume of the second single port data storage device allows accessing the second volume of the second single port data storage device in response to a request to a data request to the first volume of the first single port data storage device.

Various embodiments arrange a distributed data storage network with a remote host connected to a diskgroup that has a first single port data storage device and a second single port data storage device. Each single port data storage device is initialized with a first logical volume and a second logical volume. The first logical volume of each single port data storage device stores data to service a data access request from the remote host with the second logical volume of each data storage device configured to storing data virtualized from a different single port data storage device of the diskgroup. The second volume of at least one single port data storage device of the diskgroup is accessed in response to data request to the first volume of the first single port data storage device.

In other embodiments, a data storage system has a remote host connected to a diskgroup that has a first single port data storage device and a second single port data storage device. The first single port data storage device has a first controller connected to a first memory array while the second single port data storage device has a second controller connected to a second memory array. The first single port data storage device is initialized as a first logical volume and a second logical volume by the first controller. The second single port data storage device is initialized as a third logical volume and a fourth logical volume by the second controller. A first data access request from the remote host is serviced with the first logical volume as directed by the first controller and the fourth logical volume is accessed by the second controller in response to a request to a data request to the first volume.

DETAILED DESCRIPTION

Various embodiments of this disclosure are generally directed to providing multi-port data storage device capabilities to a single port data storage device via virtualization.

Advancements in data storage device technology have emphasized the efficiency and performance of data processing. The ability to bypass some data processing with non-volatile memory express (NVMe) protocol allows increased amounts of data to pass to a data storage device, which can be particularly useful in distributed data storage networks where data requests from numerous different hosts are pending. However, such increases in data storage performance can increase the susceptibility of a data storage system to failures.

While dual port data storage devices can provide redundant access to a data storage device in the event of a failure or error, such dual port devices can be expensive, complex, and difficult to implement. Accordingly, various embodiments provide fault tolerances and other capabilities of multi-port data storage devices with single port data storage devices. By virtualizing one or more other data storage devices, a single port data storage device can employ sophisticated data management and control to deliver high data storage performance with resistance to failures and/or errors occurring anywhere in a data storage system.

Figure 1:
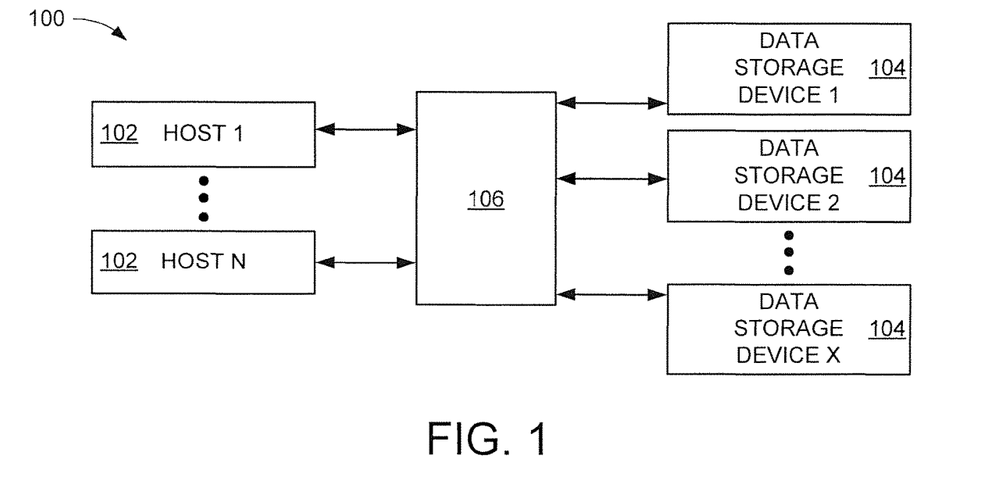
FIG. 1 is a block representation of a portion of an example data storage system arranged in accordance with various embodiments.

An example data storage system 100 in which assorted embodiments of the present disclosure can be practiced is shown as a block representation in FIG. 1. The data storage system 100 can have any number (N) of remote hosts 102 that are connected to any number of data storage devices 104 via one or more network controller 106. A remote host 102 may be a controller, computer, server, or network node while the network controller 106 may be any intervening circuitry, such as a switch, server, router, or data requests for data writes to, or data reads from, the respective data storage devices 104 can be handled by the network controller(s) 106 in order to provide the correct data from the correct source to the correct destination.

Figure 2:
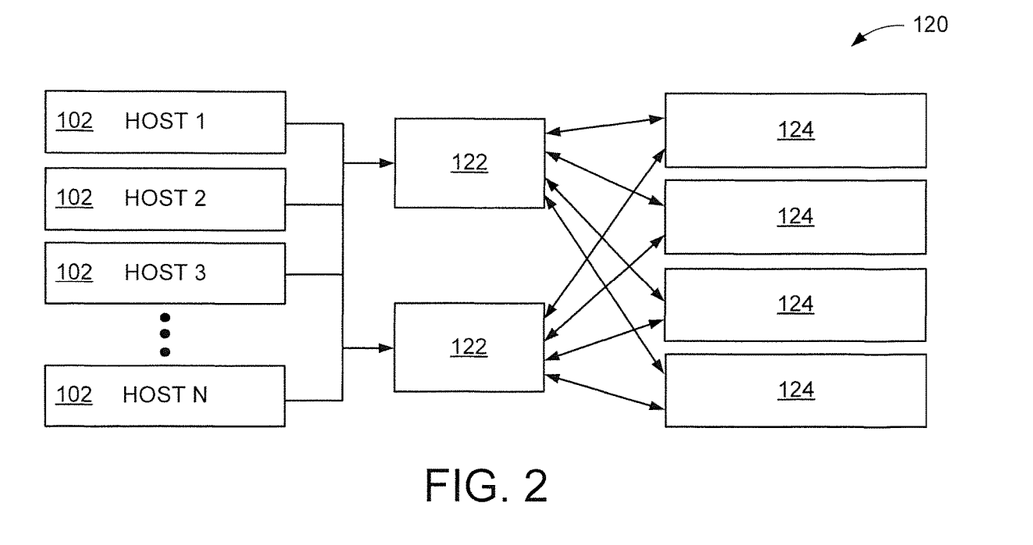
FIG. 2 displays a block representation of a portion of an example data storage system arranged in accordance with some embodiments.

Such network controller 106 involvement in each host data request corresponds with suppressed data storage performance, such as high data latency, and high susceptibility to controller 106 errors and failure. It is noted that the various data storage devices 104 can be physically separated, such as in different cities, states, countries, or hemispheres, while some devices 104 may be physically grouped together into a common data rack or enclosure at a single physical location. Likewise, the assorted hosts 102 can be physically separated, or commonly located, which allows the data storage system 100 to be a distributed data storage network satisfying data access requests FIG. 2 conveys a block representation of an example data storage system 120 arranged with multiple network controllers 122 that respectively connect remote hosts 102 with numerous different data storage devices 104. The use of multiple different network controllers 122 can diminish the susceptibility of the system 120 to component errors and/or failures while increases the overall data bandwidth of the system 120. In yet, increased amounts of hosts 102 and/or data requests have stifled data storage system performance as the network controller(s) 106 become a bottleneck when processing each data access request between the respective hosts 102 and data storage devices 104.

The implementation of NVMe and remote direct memory access (RDMA) technologies can boost the performance of the system 120 by decreasing the amount of processing conducted by the network controller(s) 122. However, the use of single port data storage devices 104, as shown in FIG. 1, can remain a performance bottleneck with susceptibility to data path and data storage device 104 faults. Hence, a multi-port data storage device 124 can be utilized to provide two or more data pathways that may implement NVMe and RDMA technologies to optimize data storage performance while mitigating system 120 degradation in response to a component error or failure. For instance, the independent ports of device 124 can be used for redundant or alternate data pathways in the event a fault causes one port to be offline.

Figure 3:
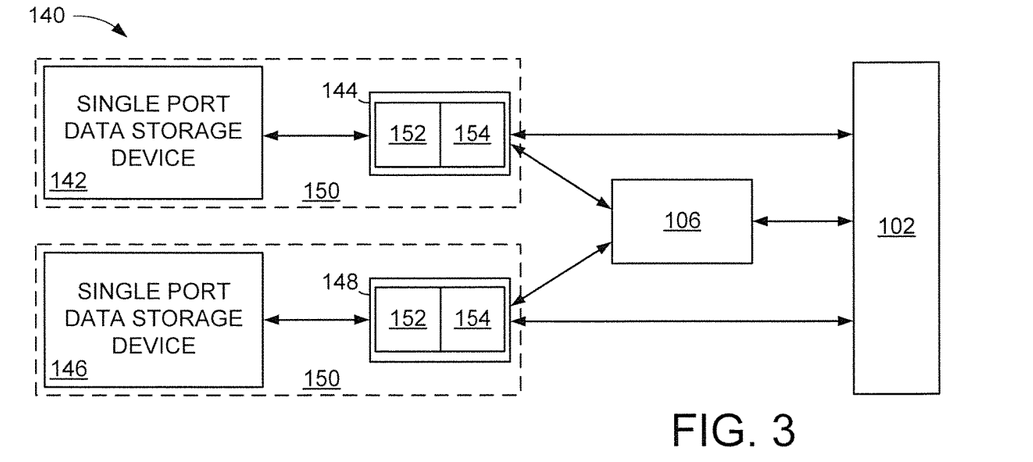
FIG. 3 shows a block representation of a data storage system established and operated in accordance with assorted embodiments.

While the use of multi-port data storage devices 124 can provide performance capabilities that optimize the data storage system 120, the cost and implementation of multi-port devices 124 can be costly. Therefore, assorted embodiments are directed to utilizing single port data storage devices 104 intelligently to provide the capabilities of the multi-port data storage device 124. FIG. 3 is a block representation of an example data storage system 140 that is configured in accordance with various embodiments to utilize two or more single port data storage devices to emulate a multi-port data storage device. It is noted that the single port data storage devices can be any type of non-volatile solid-state memory, such as NAND flash, resistive random access memory, phase change random access memory, or other memory architecture capable of supporting NVMe operation.

A first single port data storage device 142 is connected to a first controller 144 while a second single port data storage device 146 is connected to a second controller 148. It is contemplated that a single port data storage device 142/146 and controller 144/148 are packaged together in a single housing, as shown by segmented regions 150, but such configuration is not required as the respective controllers 144/148 can be positioned anywhere between a remote host 102 and a data storage device 104. In some embodiments, one or more network controllers 106 are connected to one or more of the device controllers 144/148 to provide high level data processing and/or system control, although no upstream controller 106 is required as the device controllers 144/148 can conduct all system 140 data processing and distribution.

That is, the local device controllers 144/148 can replace a centralized controller 106 by communicating with one another to choreograph servicing data access requests from hosts 102, such as data reads and data writes, as well as system maintenance operations, such as garbage collection, metadata updates, and wear mitigation. The device controllers 144/148 may also direct networking activity, such as mirroring, striping, or any combination of the two. The respective device controllers 144/148 can be arranged with multipath I/O (MPIO) circuitry 152 that provides a plurality if alternate electrical pathways, which adds the ability to mitigate system faults as well as provide load balancing.

The MPIO may be utilized by one or more RDMA module 154 of a device controller 144/148 to conduct direct memory access to a device 142/146. The circuitry of the RDMA modules 154, such as host channel adapters, can provide asynchronous work queues and kernel bypass to read, and write, data directly to/from the single port data storage devices 142/146 without being processed by the controller of that device 144/148. The use of an RDMA module 154 in combination with NVMe optimizes data flow between data storage devices 142/146 by utilizing multiple concurrent, or independent, PCIe interface pathways.

By intelligently employing the circuitry of the device controllers 144/148 with, or without, one or more network controllers 106, data can be moved between the single port data storage devices 142/146 as directed by a single respective controller 144/148. Such efficient movement of data allows for optimized virtualization in the respective single port data storage devices 142/146.

Figure 4:
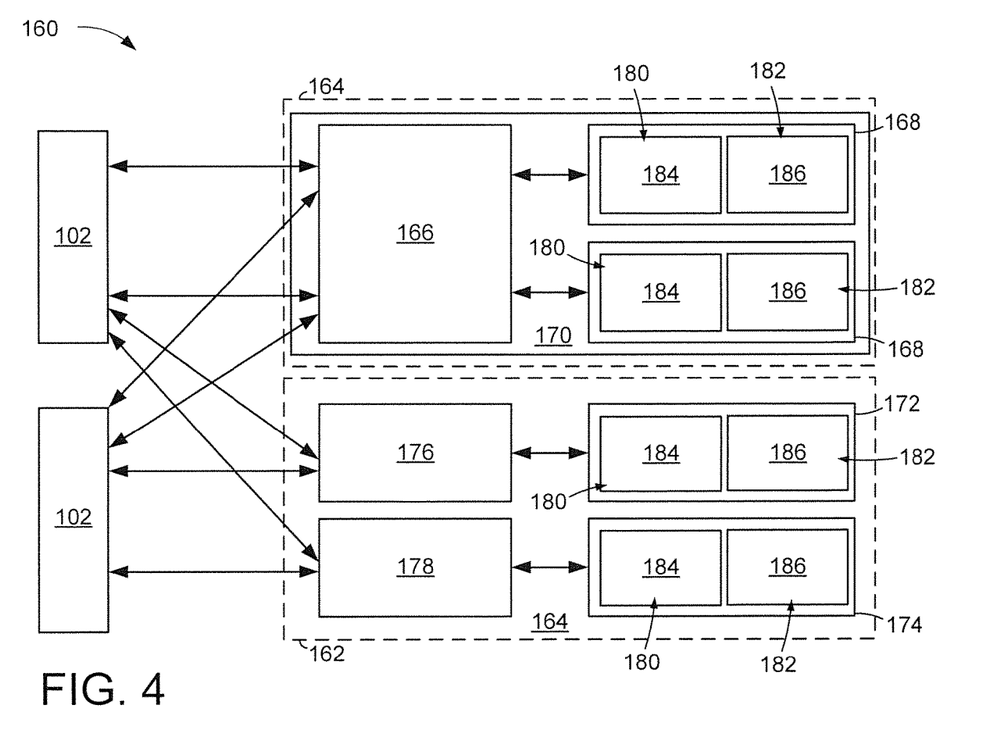
FIG. 4 conveys a block representation of portions of an example data storage system arranged in accordance with various embodiments.

FIG. 4 conveys a block representation of portions of an example data storage system 160 arranged in accordance with various embodiments to provide multi-port device capabilities from two or more single port data storage devices 142/146. As shown, a plurality of remote hosts 102 are connected to a first diskgroup 162 and a second diskgroup 164. The various host 102 connections may be facilitated by MPIO circuitry in the respective hosts 102 and/or multiplexed interconnections.

Each diskgroup 162/164 can consist of two or more data storage devices 104 and corresponding controllers. In the non-limiting example of FIG. 4, the first diskgroup 162 has a single enclosure controller 166 that is connected to two single port solid-state memory arrays 168 that are each housed in a single enclosure 170, such as in a storage rack at a physical location with other enclosures. The second diskgroup 164 consists of two separate single port solid-state memory arrays 172/174 each connected to a respective array controller 176/178 as part of separate data storage devices 104. That is, the second diskgroup 164 comprises two separate data storage devices 104 that each have a memory and controller, which makes the respective devices 104 standalone components that may, or may not, be installed in different independent housings and/or installed in different computing means, such as a computer, smartphone, server, or mass data storage configuration.

It is noted that the ability to connect a single controller 166 for multiple single port solid-state memory arrays 168 or a single controller 176/178 for one single port solid-state memory array 172/174 allows a data storage system 160 to be customized to the particular data storage environment. For example, a cloud computing environment with relatively high data throughput demands may be configured with independent controllers per memory array while a local network attached storage server may be configured with a single controller directing data storage activity for multiple different memory arrays.

Regardless of the number and configuration of controllers per memory array, various embodiments provide dual port data storage device capabilities with each diskgroup 162/164 by segmenting each memory array 168/172/174 via virtualization. By initializing each memory array 168/172/174 into separate logical volumes 180/182, a controller 166/176/178 can service requested data access requests from one or more hosts 102 via one volume 184 while storing portions of the other memory array(s) in a different volume 186. For instance, diskgroup 164 can conduct routine data storage and retrieval from a main logical volume 184 of a first memory array 172 concurrently, or consecutively, with writing data contained in the second memory array 174 to a secondary volume 186, as directed by the controller 176 of the first memory array 172.

In this way, each controller 176/178 can organize, schedule, and execute the servicing of data access requests and maintaining data from a different memory array in different logical volumes 184/186 of a single memory array 172. Arranging each memory array 172 of a diskgroup 162/164 to concurrently maintain different logical volumes of data from other memory arrays of the diskgroup allows for optimized fault tolerance and data access servicing performance. It is noted that while data originating in a different/separate memory array is stored in a separate logical volume 186 from the logical volume 184 servicing data access requests in the non-limiting example of FIG. 4, such configuration is not required and data from other memory arrays can be stored in any logical volume, such as the same logical volume 184 that services data access requests from remote hosts 102.

The transfer of data between different memory arrays of a diskgroup 162/164 can be initiated and conducted by one or more controllers 166/176/178. Such data transfer may employ one or more RDMA modules to optimize data movement without inhibiting the destination memory array, and controller, servicing data access requests and any memory maintenance operations, such as garbage collection, metadata updates, or internal wear mitigation. The use of RDMA circuitry allows a controller to orchestrate and execute the transfer of at least all user-originated data to a memory array controlled by a different controller, which allows the destination array controller to service data access requests and/or data maintenance operations.

It is contemplated that the transfer of data between different memory arrays of a diskgroup 162/164 is concurrent with, or independent of, the servicing of data access requests from at least one remote host 102. For instance, a controller 166/176/178 can intelligently schedule, execute, pause, and modify copying all the user-originated data from one memory array to a different memory array of the diskgroup 162/164. The use of different logical volumes, which may, or may not, involve the loading of operating system software and firmware in virtual machine, or container, virtualization schemes, allows for increased control efficiency and security as different data access and transfer operations can be conducted to different logical volumes 184/186 by different controllers 176/178 without concern for redundancy, conflict, or error.

Figure 5:
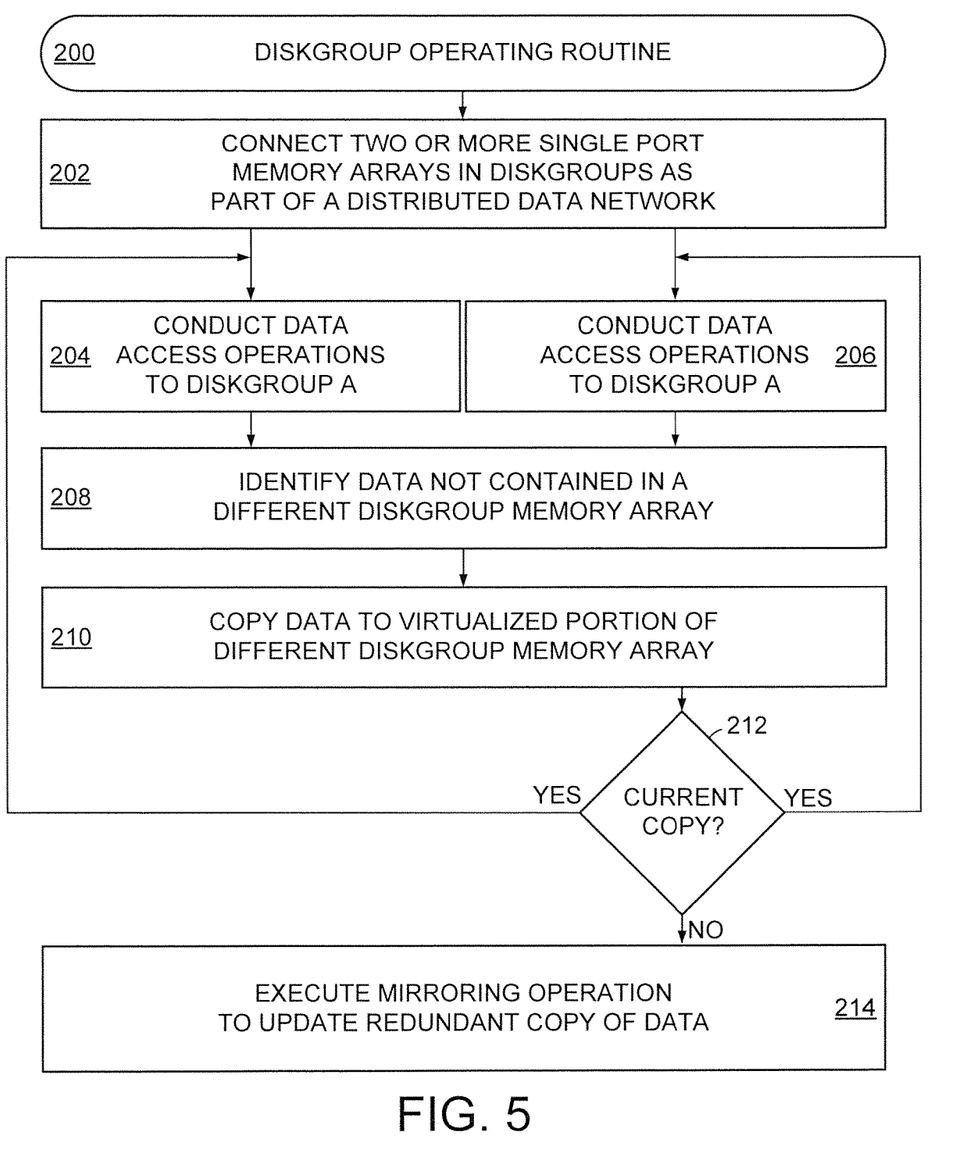
FIG. 5 is a flowchart of an example diskgroup operating routine conducted with the various aspects of FIGS. 1-4 in accordance with some embodiments.

FIG. 5 is a flowchart of an example diskgroup operating routine 200 that can be conducted with the various aspects of FIGS. 1-4 in accordance with some embodiments. The routine 200 begins by establishing a diskgroup in step 202 by connecting two or more single port memory arrays to a network. As discussed above, the memory arrays can be connected to the network via independent controllers or via a single diskgroup controller. The memory arrays of the diskgroup are respectively employed in steps 204 and 206 to conduct data access operations that result in host-originated data being written to the respective arrays.

As host-originated data fills the respective memory arrays, the connected controller(s) identify data not contained in a different diskgroup memory array in step 208. In other words, step 208 analyzes what redundant host-originated data is stored in at least one memory array of the diskgroup to identify what data transfers need to occur so that at least one redundant copy of host-originated data is present in another memory array of the diskgroup. Step 208 may be conducted in cooperation with other controllers of the diskgroup.

Step 210 proceeds to copy the data identified in step 208 to a different memory array of the diskgroup so that at least one redundant copy of data is stored in two different virtualized, or emulated, portions of different memory arrays. At some time after step 210 has copied data, decision 212 determines if any copy resident in a non-original memory array is current by comparing the logical volumes of the different memory arrays. If a copy is not a current, valid copy of another memory array of the diskgroup, the controller originally writing data into the diskgroup schedules and executes a mirroring operation in step 214 that copies some, or all, of a memory array of the diskgroup to a different memory array of the diskgroup.

The copying of data steps 210 and 214 can be conducted like a redundant array of independent devices (RAID) level 1 data distribution where a controller directs mirrored copies of data to a variety of different destinations. In some embodiments, steps 210 and/or 214 are conducted via RDMA circuitry while other embodiments establish a new virtual volume to store the data copied from a different memory array of the diskgroup. The conclusion of step 214, or in the event the copies of the respective memory arrays is up to date, returns routine 200 to steps 204 and 206 where data access reads and/or writes are independently, or concurrently, conducted to/from the respective memory arrays. It is contemplated that step 214 can utilize other types of data copying among memory arrays of a diskgroup, such as striping and parity, but no specific data distribution is required or limiting.

Figure 6:
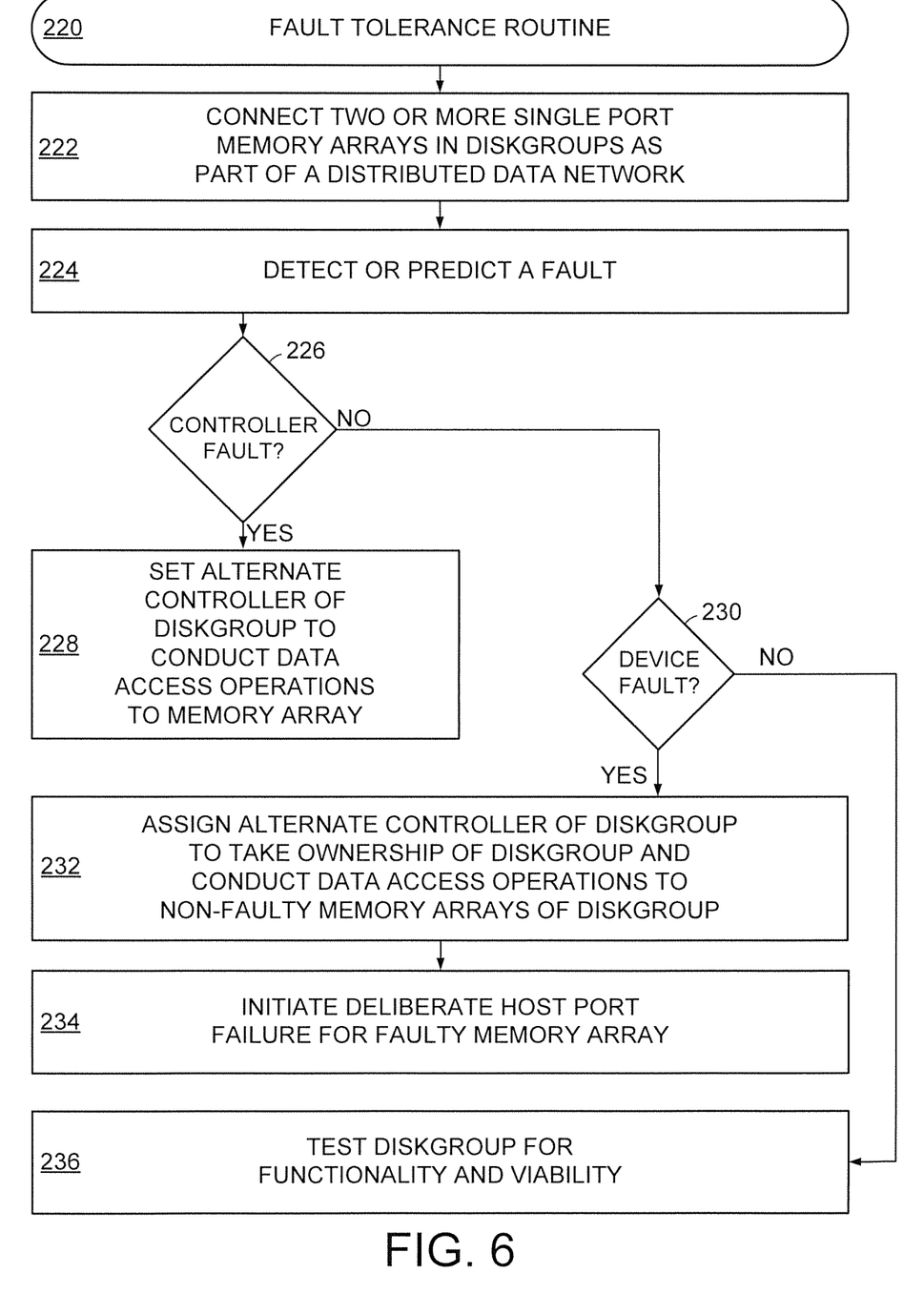
FIG. 6 provides an example fault tolerance routine executed by the assorted embodiments of FIGS. 1-4 in accordance with assorted embodiments.

The ability to utilize two or more single port memory arrays, and associated controller(s), to continuously store redundant copies of data from other memory arrays of a diskgroup in different virtual volumes allows for enhanced fault tolerance compared to utilizing memory arrays without virtualized redundancy. FIG. 6 provides an example fault tolerance routine 220 that can be executed in conjunction with routine 200 by the assorted embodiments of FIGS. 1-4 to optimize the handling of distributed data errors and failures. Step 222 initially connects at least two single port memory arrays as a diskgroup to remote hosts in a distributed network.

Anytime during the operation of the distributed network, a fault can be detected or predicted by one or more controllers in step 224. A fault can be characterized as any temporary, or permanent, error or failure to one or more components of the distributed network. For example, a fault may occur in a controller, memory array, and/or host that can interrupt, delay, or prevent execution of one or more data access requests, memory maintenance operations, or status updates. A fault may prevent operation of less than an entire component, or an aspect of the distributed network, such as an error inhibiting data writing, but not data reading from a memory array.

A predicted or detected fault from step 224 is evaluated in decision 226 to determine if the fault originates in a controller. Decision 226 may conduct one or more tests to determine the type, extent, and consequences of the fault. For instance, decision 226 can test each controller of a distributed data storage network individually, or sequentially, to identify the location of the fault, whether portions of the afflicted controller still function, and if the fault is temporary or permanent. A determination that a fault is isolated to a particular controller triggers step 228 to set an alternate controller to conduct data access operations from the redundant copy of the memory array inhibited by the controller fault.

In the event a fault is not with a controller, decision 230 evaluates if the fault lies with a memory array. Any number and different types of tests can be conducted with decision 230 to determine if portions of memory array remain viable for data storage operations. If so, various embodiments may reorganize the logical volumes of the affected memory array in order to avoid the fault. If the memory array cannot be saved, step 232 assigns an alternate controller of the diskgroup to take ownership of the diskgroup and conduct data access operations to non-faulty memory arrays of the diskgroup.

The assigning of an alternate controller in step 232 is followed by step 234 initiating a deliberate host port failure for the faulty memory array. Step 234 may trigger MPIO from the host so that the alternate controller can conduct all diskgroup data access activities to/from the viable memory array(s) of the diskgroup. If the detected fault is not in a controller or memory array, routine 200 tests at least a portion of a diskgroup for functionality and viability in step 236. A continuous fault can trigger heightened testing and scrutiny, such as conducting decisions 226 and 230 again, to identify the origin of one or more recurring faults. Once no faults are present from step 236, the routine 220 returns to normal operation until another fault is detected or predicted.

Through the various embodiments of a distributed data storage network, the capabilities of multi-port solid-state data storage devices can be reproduced by single port data storage devices as part of a diskgroup. The intelligent use of logical volumes to store redundant copies of other memory arrays of a diskgroup allows for efficient data access performance while providing optimized fault tolerance. The use of NVMe, RDMA, and MPIO technologies can further heighten the performance and capabilities of a diskgroup by allowing controllers to dynamically adapt to system conditions to service data access requests and maintain up-to-date copies of data in logical volumes.

What is claimed is:

1. A method comprising:
    connecting a host to a diskgroup comprising a first single port data storage device and a second single port data storage device, the diskgroup comprising a first controller connected to the first single port data storage device and a second controller connected to the second single port data storage device;
    initializing a first logical volume and a second logical volume in each single port data storage device with the respective first controller and second controller;
    servicing a data access request from the host with the first logical volume of the first single port data storage device;
    virtualizing data from the first logical volume of the first single port data storage device to the second volume of the second single port data storage device with the second controller via a first remote data memory access module of the first single port data storage device; and
    accessing the second volume of the second single port data storage device with the first controller via a second remote data memory access module of the second single port data storage device in response to a request to a data request to the first volume of the first single port data storage device.

2. The method of claim 1, wherein the first logical volume of the first single port data storage device is classified as unavailable prior to the accessing step.

3. The method of claim 2, wherein the first logical volume of the first single port data storage device is unavailable due to a fault.

4. The method of claim 3, wherein the fault is predicted and the accessing step is conducted proactively.

5. The method of claim 3, wherein the fault is tested and confirmed prior to assigning the second logical volume of the second single port data storage device to service future data access requests.

6. The method of claim 1, wherein the data is copied from the first logical volume of the first single port data storage device to the second volume of the second single port data storage device via mirroring.

7. The method of claim 1, wherein the first single port data storage device is disabled by the second single port data storage device in response to the first single port data storage device having a fault.

8. A system comprising a remote host connected to a diskgroup comprising a first single port data storage device and a second single port data storage device, the diskgroup comprising a first controller connected to the first single port data storage device and a second controller connected to the second single port data storage device, each controller comprising a multipath I/O circuitry and a remote data memory access module, each single port data storage device initialized with a first logical volume and a second logical volume by the respective first controller and second controller, the first logical volume of each single port data storage device accessed by the remote data memory access module of a controller of a different single port data storage device to store data to service a data access request from the remote host, the second logical volume of each data storage device configured to accessed by the remote data memory access module of a controller of a different single port data storage device to store data emulated from a different single port data storage device of the diskgroup, the second volume of at least one single port data storage device of the diskgroup accessed by a remote data memory access module in response to data request to the first volume of the first single port data storage device.

9. The system of claim 8, wherein each single port data storage device comprises a device controller and a solid-state memory array.

10. The system of claim 8, wherein the first single port data storage device is positioned in a separate location than the second single port data storage device.

11. The system of claim 8, wherein each single port data storage device is housed within a common enclosure.

12. The system of claim 9, wherein the device controller and solid-state memory array are positioned within a single housing.

13. A method comprising:
    connecting a remote host to a diskgroup comprising a first single port data storage device and a second single port data storage device, the first single port data storage device comprising a first controller connected to a first memory array, the second single port data storage device comprising a second controller connected to a second memory array, each controller comprising a multipath I/O connecting to the respective single port data storage devices;
    initializing a first logical volume and a second logical volume in the first single port data storage device with the first controller;
    initializing a third logical volume and a fourth logical volume in the second single port data storage device with the second controller;
    servicing a first data access request from the remote host with the first logical volume as directed by the second controller via a first remote data memory access module of the first single port data storage device; and
    accessing the fourth logical volume in response to a request to a data request to the first volume by the first controller via a second remote data memory access module of the second single port data storage device.

14. The method of claim 13, wherein the second logical volume is a virtualized copy of the third logical volume accessed by the first controller.

15. The method of claim 13, wherein the fourth logical volume is a virtualized copy of the first logical volume accessed by the first controller.

16. The method of claim 13, wherein a second data access request is serviced with the third logical volume as directed by the second controller.

17. The method of claim 13, wherein each single port data storage device connects to the respective controller with a non-volatile memory express protocol.

18. The method of claim 13, wherein the second controller accesses the first logical volume with a remote direct memory access.

19. The method of claim 13, wherein the controller deliberately initiates a host port failure in response to a diskgroup fault.

20. The method of claim 13, wherein the second controller is assigned ownership of the diskgroup in response to a fault in the first single port data storage device.

* * * * *